(12) United States Patent
Kim et al.

(10) Patent No.: US 12,702,166 B2
(45) Date of Patent: Aug. 11, 2026

(54) AEROSOL GENERATING DEVICE AND OPERATING METHOD THEREFOR

(71) Applicant: KT&G CORPORATION, Daejeon (KR)

(72) Inventors: Yong Hwan Kim, Gyeonggi-do (KR); Young Bum Kwon, Gyeonggi-do (KR); Dong Sung Kim, Seoul (KR); Hun Il Lim, Seoul (KR)

(73) Assignee: KT&G CORPORATION, Daejeon (KR)

( * ) Notice: Subject to any disclaimer, the term of this patent is extended or adjusted under 35 U.S.C. 154(b) by 440 days.

(21) Appl. No.: 18/564,827

(22) PCT Filed: Jun. 16, 2023

(86) PCT No.: PCT/KR2023/008397
§ 371 (c)(1),
(2) Date: Nov. 28, 2023

(87) PCT Pub. No.: WO2023/244083
PCT Pub. Date: Dec. 21, 2023

(65) Prior Publication Data

US 2024/0268473 A1 Aug. 15, 2024

(30) Foreign Application Priority Data

Jun. 16, 2022 (KR) ........................ 10-2022-0073787
Oct. 5, 2022 (KR) ........................ 10-2022-0127394

(51) Int. Cl.
*A24F 40/51* (2020.01)
*A24F 40/20* (2020.01)
(Continued)

(52) U.S. Cl.
CPC .............. *A24F 40/51* (2020.01); *A24F 40/20* (2020.01); *A24F 40/40* (2020.01); *A24F 40/53* (2020.01);
(Continued)

(58) Field of Classification Search
None
See application file for complete search history.

(56) References Cited

U.S. PATENT DOCUMENTS

2018/0140008 A1 5/2018 Sur et al.
2018/0263289 A1 9/2018 Qiu
(Continued)

FOREIGN PATENT DOCUMENTS

JP 2009-128530 A 6/2009
KR 10-2019-0138201 A 12/2019
(Continued)

OTHER PUBLICATIONS

International Search Report for PCT/KR2023/008397 dated Sep. 18, 2023.
(Continued)

*Primary Examiner* — Dennis R Cordray
(74) *Attorney, Agent, or Firm* — Sughrue Mion, PLLC

(57) ABSTRACT

An aerosol generating device includes a case including an accommodation passage into which a cigarette is inserted, a cover coupled to the case, a heater heating the cigarette, a humidity sensor arranged on an upper surface of the cover, and a controller configured to determine humidity of the cigarette by comparing the moisture amount, which is detected by the humidity sensor, with a preset threshold value.

15 Claims, 7 Drawing Sheets

(51) Int. Cl.

| | |
|---|---|
| ***A24F 40/40*** | (2020.01) |
| ***A24F 40/53*** | (2020.01) |
| ***A24F 40/57*** | (2020.01) |
| ***G01N 27/04*** | (2006.01) |
| ***G01N 27/22*** | (2006.01) |

(52) U.S. Cl.

CPC .......... *A24F 40/57* (2020.01); *G01N 27/048* (2013.01); *G01N 27/223* (2013.01)

(56) References Cited

U.S. PATENT DOCUMENTS

| | | | |
|---|---|---|---|
| 2020/0093185 | A1 | 3/2020 | Lim |
| 2020/0214351 | A1 | 7/2020 | Lee |
| 2021/0235770 | A1 | 8/2021 | Uthurry |
| 2022/0125110 | A1 | 4/2022 | Frake |
| 2022/0400773 | A1 | 12/2022 | Kim et al. |
| 2022/0408834 | A1 | 12/2022 | Kim et al. |

FOREIGN PATENT DOCUMENTS

| | | | |
|---|---|---|---|
| KR | 10-2020-0142013 | A | 12/2020 |
| KR | 10-2021-0092082 | A | 7/2021 |
| KR | 10-2021-0126582 | A | 10/2021 |
| KR | 10-2332542 | B1 | 11/2021 |
| KR | 10-2022-0066734 | A | 5/2022 |
| KR | 10-2022-0090217 | A | 6/2022 |
| WO | 2023/003377 | A1 | 1/2023 |
| WO | 2024/053965 | A1 | 3/2024 |

OTHER PUBLICATIONS

Written Opinion for PCT/KR2023/008397 dated Sep. 18, 2023.

Extended European Search Report dated Dec. 9, 2024 in Application No. 23798072.7.

Office Action issued Apr. 23, 2025 in Korean Patent Application No. 10-2022-0127394.

Office Action issued Feb. 11, 2025 in Korean Patent Application No. 10-2022-0127394.

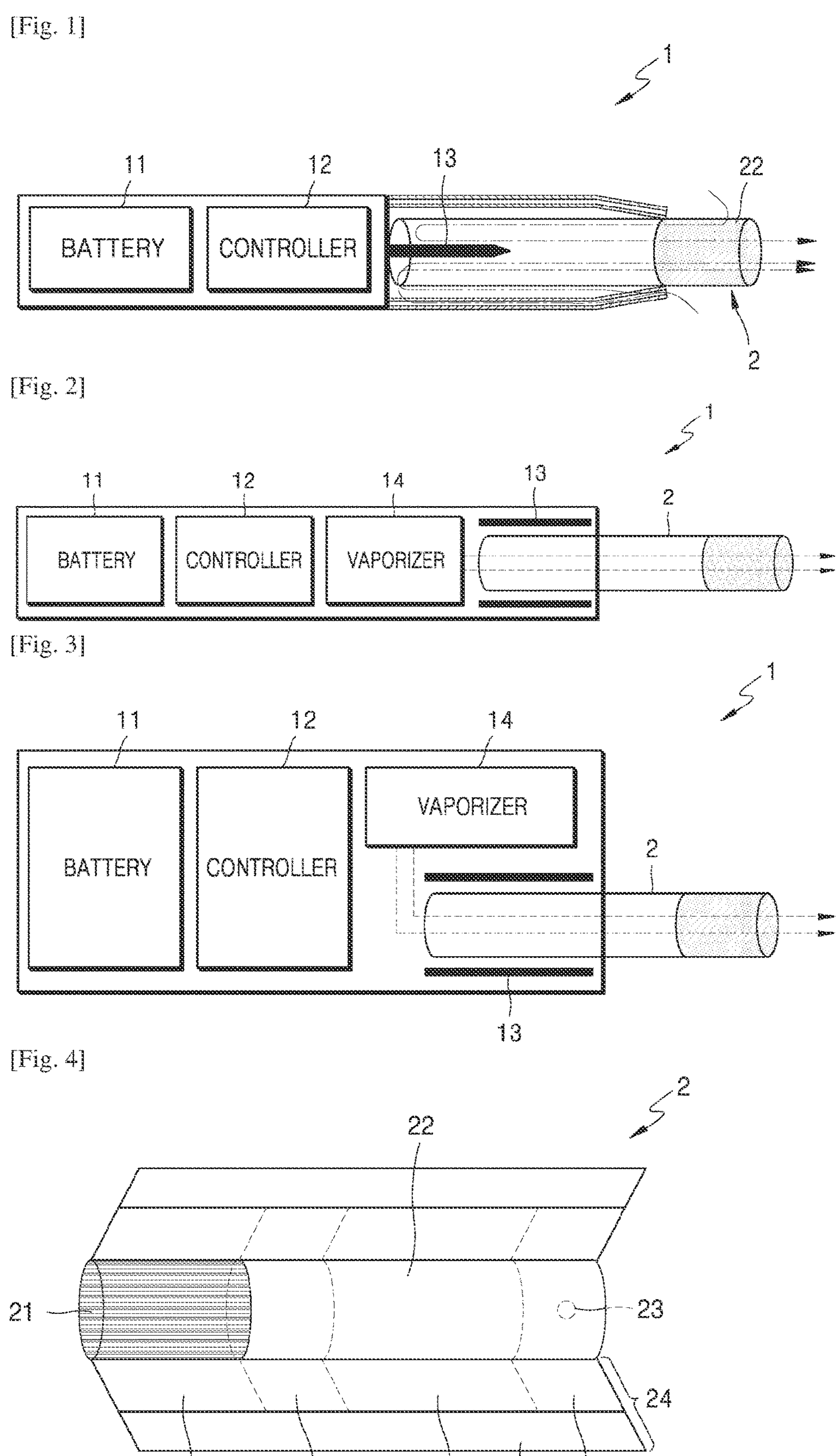
[Fig. 1]
1
11
12
13
22
BATTERY
CONTROLLER
2
[Fig. 2]
1
11
12
14
13
2
BATTERY
CONTROLLER
VAPORIZER
[Fig. 3]
1
11
12
14
BATTERY
CONTROLLER
VAPORIZER
2
13
[Fig. 4]
2
22
21
23
24
241
242
243
245
244

[Fig. 5]
[Fig. 6]
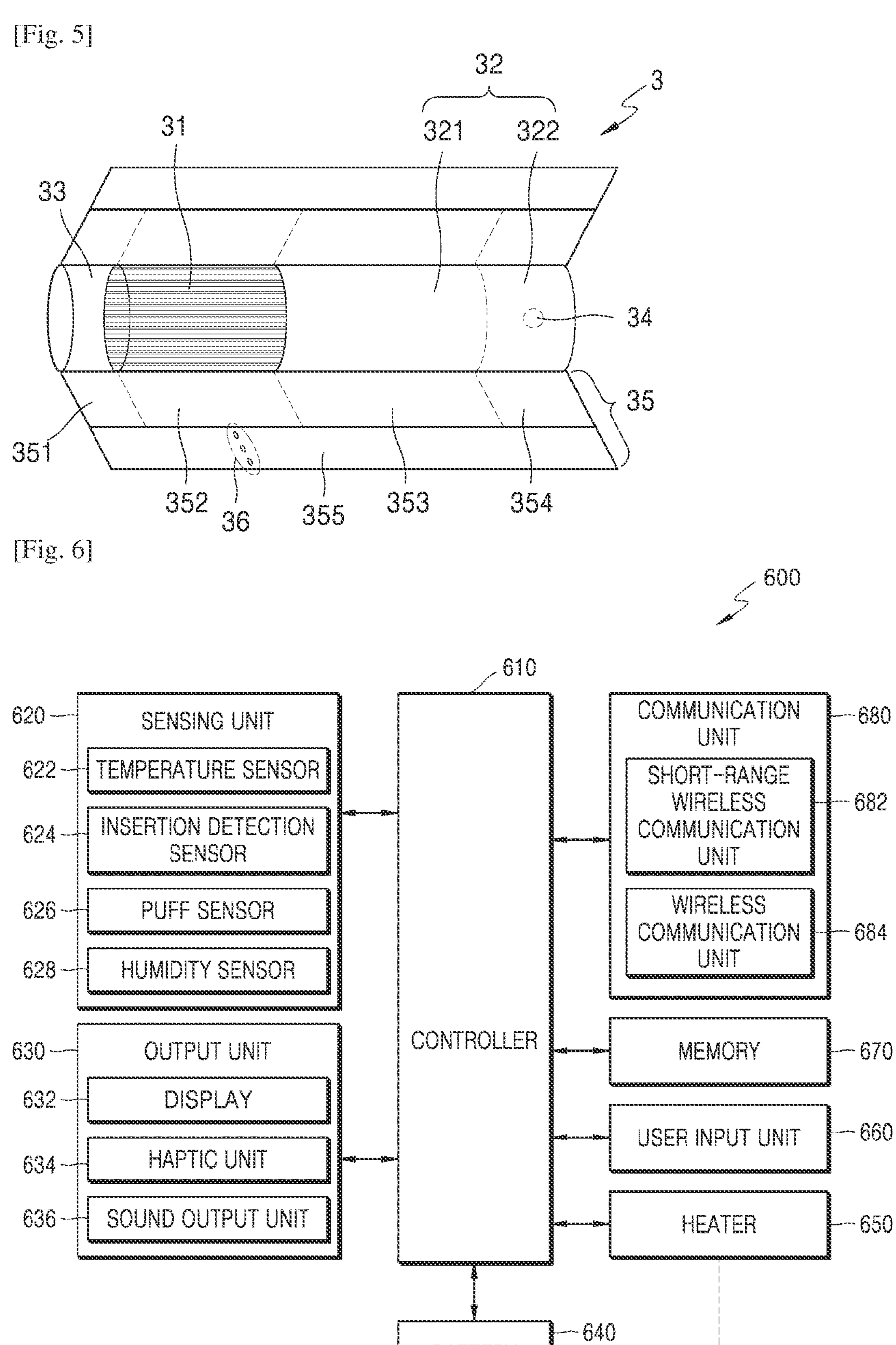

[Fig. 7A]
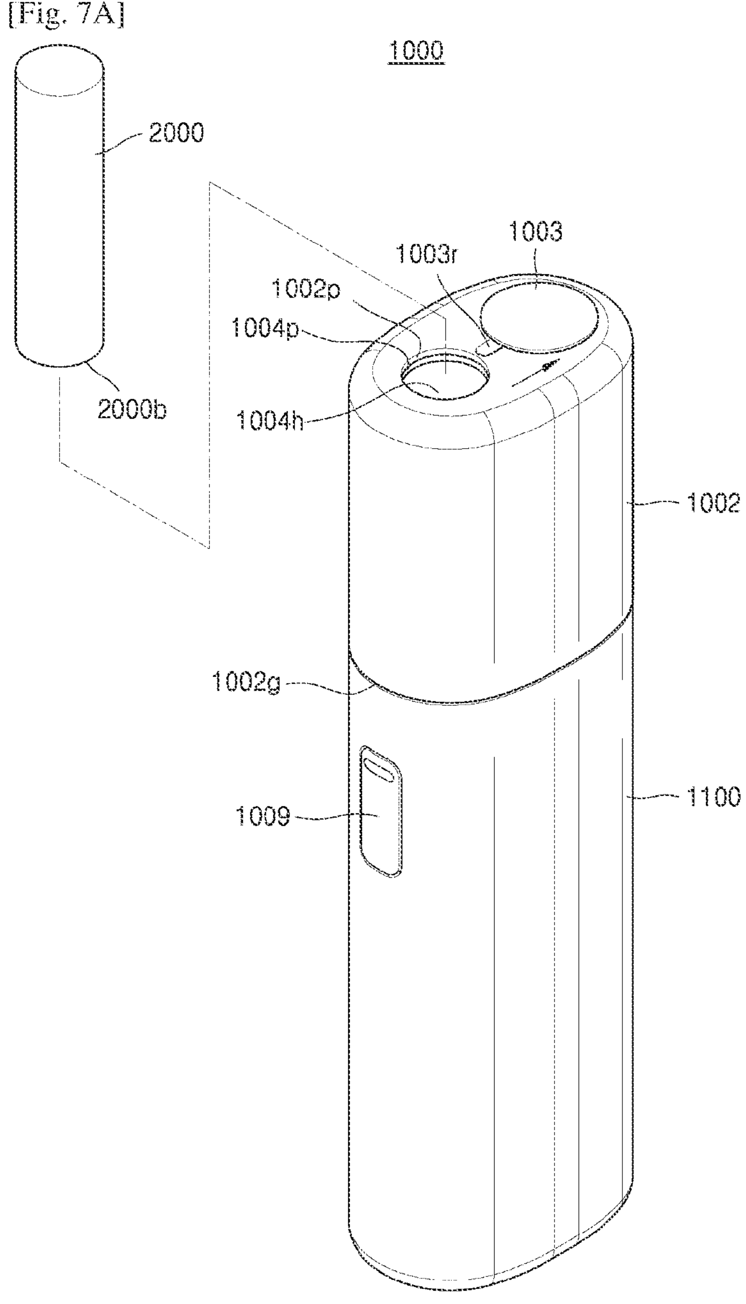

[Fig. 7B]
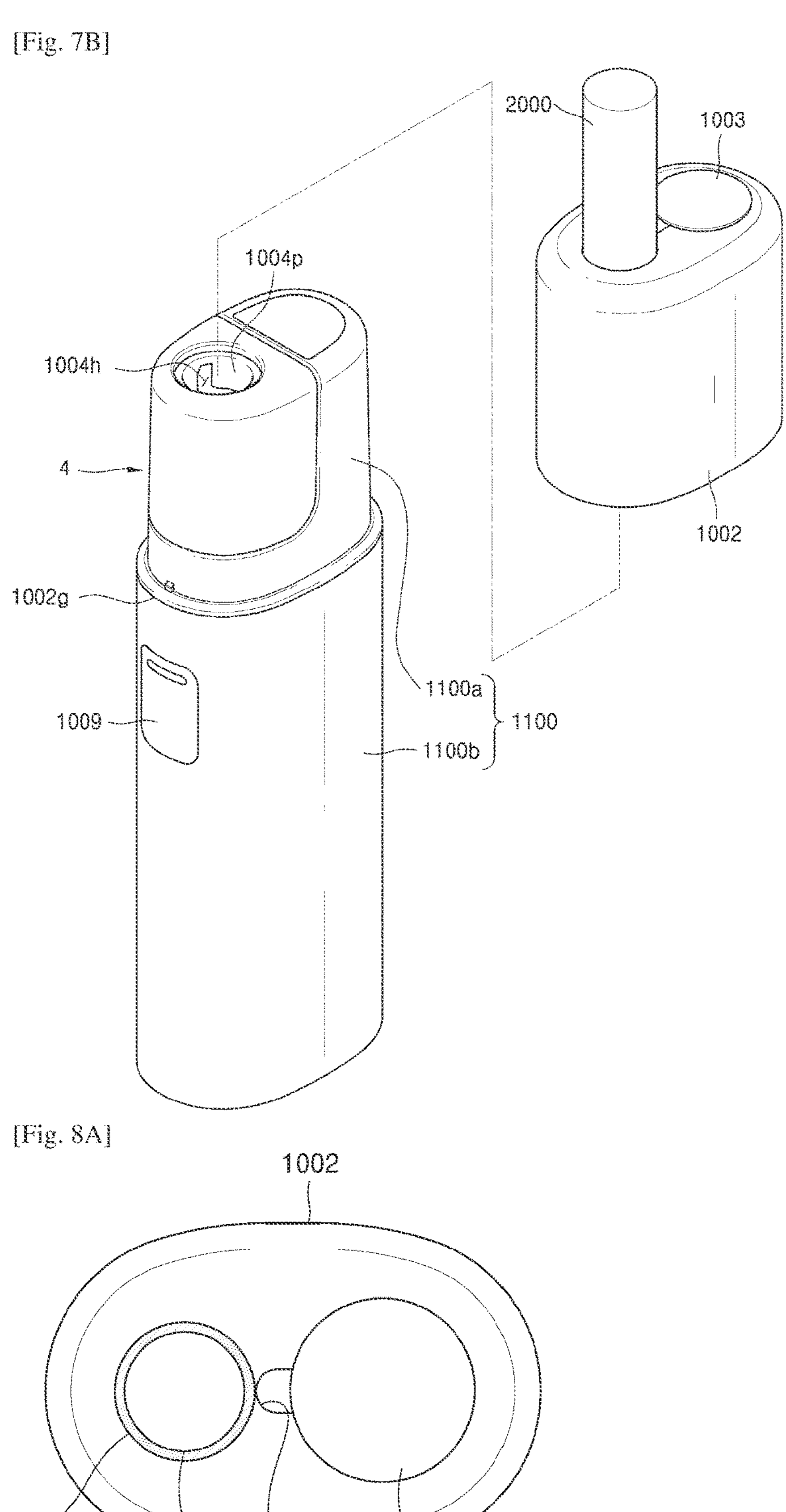
[Fig. 8A]

[Fig. 8B]
[Fig. 9A]
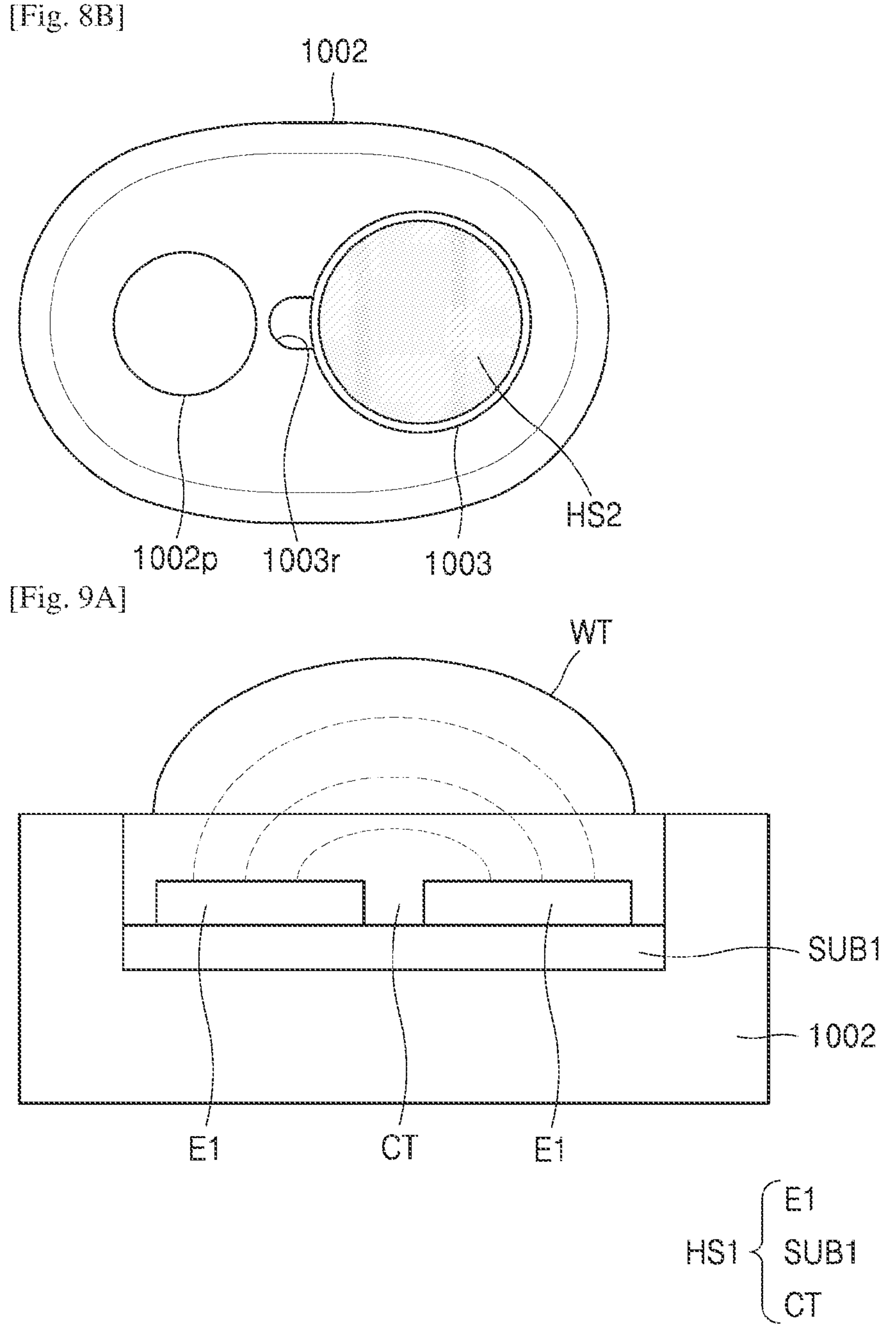

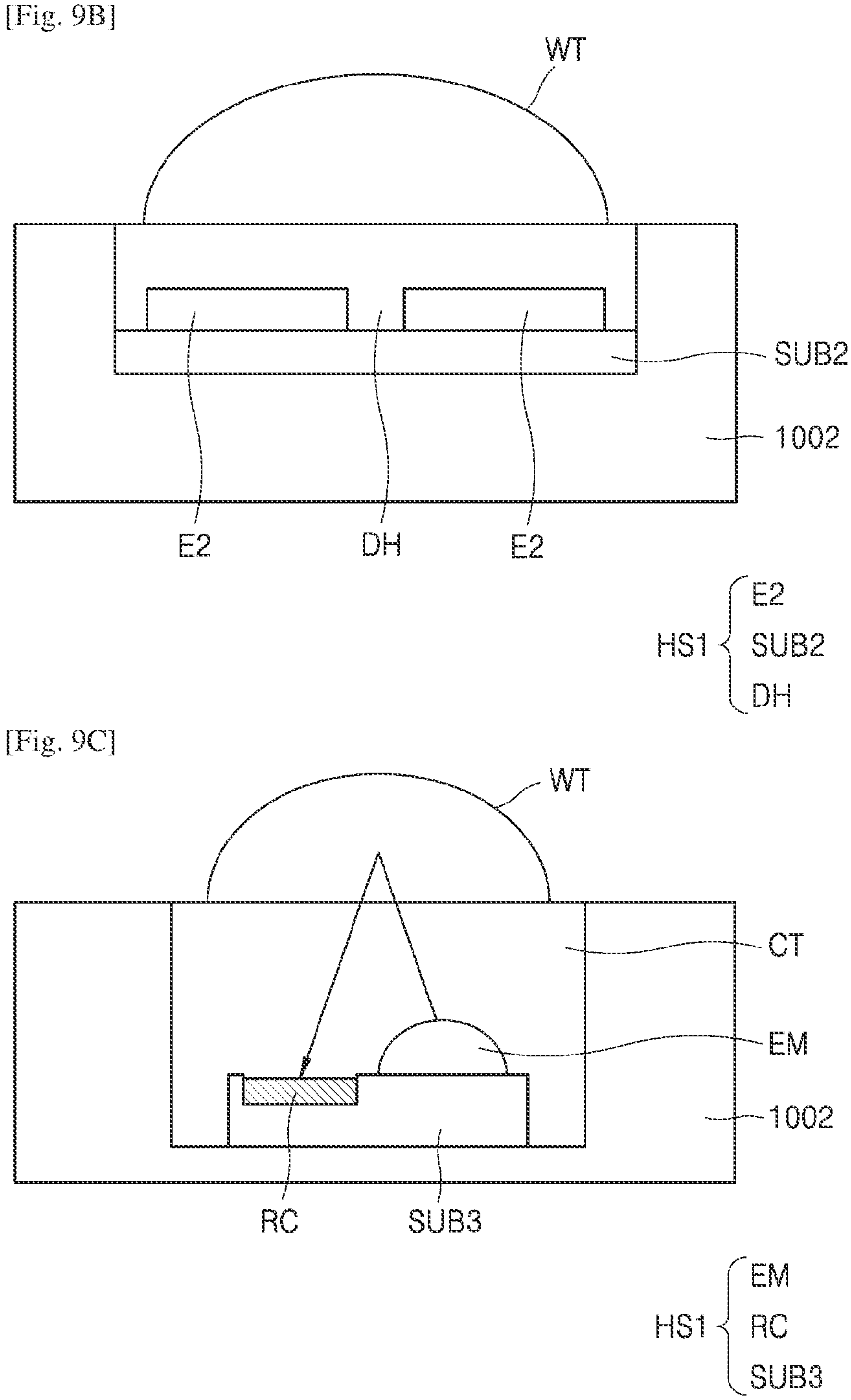
[Fig. 9B]
WT
SUB2
1002
E2
DH
E2
HS1
E2
SUB2
DH
[Fig. 9C]
WT
CT
EM
1002
RC
SUB3
HS1
EM
RC
SUB3

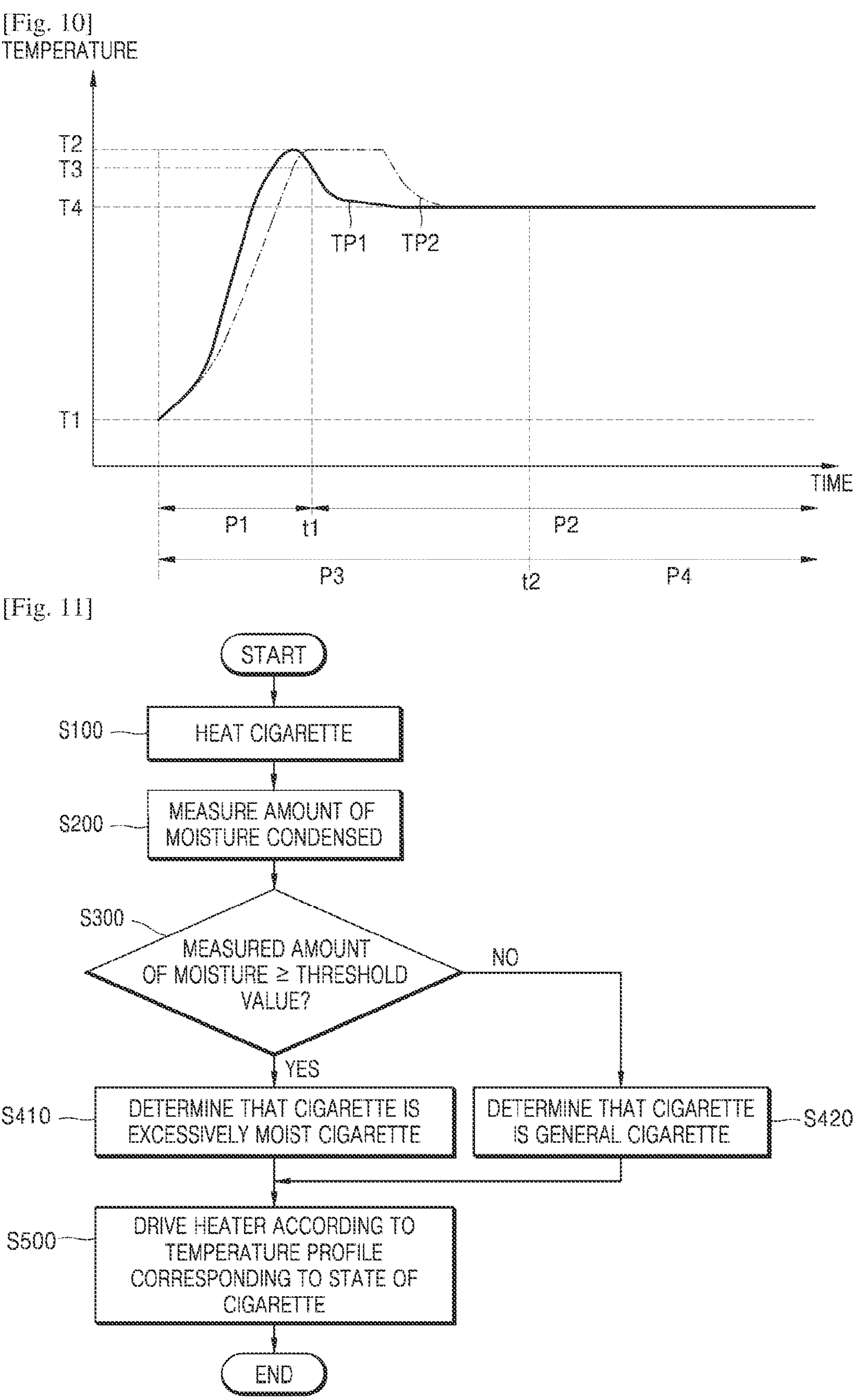
[Fig. 10]
TEMPERATURE
T2
T3
T4
T1
TP1
TP2
TIME
P1
t1
P2
P3
t2
P4
[Fig. 11]
START
S100
HEAT CIGARETTE
S200
MEASURE AMOUNT OF MOISTURE CONDENSED
S300
MEASURED AMOUNT OF MOISTURE ≥ THRESHOLD VALUE?
NO
YES
S410
DETERMINE THAT CIGARETTE IS EXCESSIVELY MOIST CIGARETTE
DETERMINE THAT CIGARETTE IS GENERAL CIGARETTE
S420
S500
DRIVE HEATER ACCORDING TO TEMPERATURE PROFILE CORRESPONDING TO STATE OF CIGARETTE
END

AEROSOL GENERATING DEVICE AND OPERATING METHOD THEREFOR

CROSS REFERENCE TO RELATED APPLICATIONS

This application is a National Stage of International Application No. PCT/KR2023/008397 filed Jun. 16, 2023, claiming priority based on Korean Patent Application No. 10-2022-0073787 filed Jun. 16, 2022 and Korean Patent Application No. 10-2022-0127394 filed Oct. 5, 2022, the disclosures of which are incorporated by reference herein in their entirety.

TECHNICAL FIELD

One or more embodiments relate to an aerosol generating device and an operating method for the same. In particular, one or more embodiments relate to an aerosol generating device capable of providing an operation mode corresponding to humidity of a cigarette detected by a humidity sensor, and an operating method for the same.

BACKGROUND ART

Recently, the demand for a smoking method to replace general cigarettes has increased. For example, there is an increasing demand for a method of generating an aerosol by heating an aerosol generating material in cigarettes, rather than by burning cigarettes. Accordingly, studies on a heating-type cigarette or a heating-type aerosol generating device have been actively conducted.

Moisture has greater specific heat than air and a greater thermal capacity than air at the same temperature. Thus, when a user inhales an aerosol with a high moisture content, the user may experience significantly greater heat than when inhaling air at the same temperature.

DISCLOSURE OF INVENTION

Technical Problem

The disclosure provides an aerosol generating device capable of distinguishing a general cigarette from an excessively moist cigarette, and an operating method of the same.

The disclosure provides an aerosol generating device including an operation mode corresponding to each of the general cigarette and the excessively moist cigarette, and an operating method of the same.

The technical problems of the disclosure are not limited to the aforementioned description, and other technical problems that are not stated herein may be clearly understood by one of ordinary skill in the art to which embodiments of the disclosure pertain, from the present specification and the attached drawings.

Solution to Problem

According to one or more embodiments, an aerosol generating device includes a case including an accommodation passage into which a cigarette is inserted, a cover coupled to the case, a heater heating the cigarette, a humidity sensor arranged on an upper surface of the cover, and a controller configured to determine humidity of the cigarette by comparing the moisture amount, which is detected by the humidity sensor, with a preset threshold value.

According to one or more embodiments, an operating method of an aerosol generating device includes heating a cigarette by a heater, determining humidity of the cigarette by comparing a moisture amount, which is detected by a humidity sensor, with a preset threshold value, and driving the heater according to a temperature profile corresponding to the determined humidity of the cigarette. The aerosol generating device includes a case, which includes an accommodation passage into which the cigarette is inserted, and an external hole coupled to the case and overlapping the accommodation passage in a thickness direction, and the humidity sensor is arranged on an upper surface of the cover.

Advantageous Effects of Invention

According to an aerosol generating device and an operating method of the same, a general cigarette may be distinguished from an excessively moist cigarette by using a humidity sensor.

According to an aerosol generating device and an operating method of the same, operation modes respectively corresponding to a general cigarette and an excessively moist cigarette may be provided.

Effects of the embodiments are not limited to those stated above, and effects that are not described herein may be clearly understood by one of ordinary skill in the art from the present specification and the attached drawings.

BRIEF DESCRIPTION OF DRAWINGS

FIGS. 1 to 3 are diagrams showing examples in which a cigarette is inserted into an aerosol generating device.

FIGS. 4 and 5 show examples of cigarettes.

FIG. 6 is a block diagram of an aerosol generating device according to another embodiment.

FIG. 7A is a perspective view of the exterior of an aerosol generating device, according to an embodiment.

FIG. 7B is a perspective view showing an operation state in which some components are separated from an aerosol generating device according to the embodiment of FIG. 7A.

FIGS. 8A and 8B each are a top view of a cover of FIGS. 7A and 7B.

FIG. 9A is a cross-sectional view of a capacitive humidity sensor.

FIG. 9B is a cross-sectional view of an electrically resistive humidity sensor.

FIG. 9C is a cross-sectional view of an optical humidity sensor.

FIG. 10 is a graph for explaining temperature profiles.

FIG. 11 is a flowchart of an operating method of an aerosol generating device, according to an embodiment.

MODE FOR THE INVENTION

Regarding the terms in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, terms which can be arbitrarily selected by the applicant in particular cases. In such a case, the meaning of the terms will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word “comprise” and variations such as “comprises” or “comprising” will be understood to imply the inclusion of stated elements but not the exclusion of any other elements. In addition, the terms “-er”, “-or”, and “module” described in the specification mean units for processing at least one function and operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, one or more embodiments of the disclosure are described in detail with reference to the attached drawings.

FIGS. 1 through 3 are diagrams showing examples in which a cigarette is inserted into an aerosol generating device.

Referring to FIG. 1, the aerosol generating device 1 may include a battery 11, a controller 12, and a heater 13. Referring to FIGS. 2 and 3, the aerosol generating device 1 may further include a vaporizer 14. Also, the cigarette 2 may be inserted into an inner space of the aerosol generating device 1.

FIGS. 1 through 3 illustrate components of the aerosol generating device 1, which are related to the present embodiment. Therefore, it will be understood by one of ordinary skill in the art related to the present embodiment that other general-purpose components may be further included in the aerosol generating device 1, in addition to the components illustrated in FIGS. 1 through 3.

Also, FIGS. 2 and 3 illustrate that the aerosol generating device 1 includes the heater 13. However, as necessary, the heater 13 may be omitted.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 3 illustrates that the vaporizer 14 and the heater 13 are arranged in parallel. However, the internal structure of the aerosol generating device 1 is not limited to the structures illustrated in FIGS. 1 through 3. In other words, according to the design of the aerosol generating device 1, the battery 11, the controller 12, the heater 13, and the vaporizer 14 may be differently arranged.

When the cigarette 2 is inserted into the aerosol generating device 1, the aerosol generating device 1 may operate the heater 13 and/or the vaporizer 14 to generate aerosol from the cigarette 2 and/or the vaporizer 14. The aerosol generated by the heater 13 and/or the vaporizer 14 is delivered to a user by passing through the cigarette 2.

As necessary, even when the cigarette 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette is inserted into the aerosol generating device 1, the heater 13 may be located outside the cigarette. Thus, the heated heater 13 may increase a temperature of an aerosol generating material in the cigarette.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the beater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIGS. 1 through 3 and may include various shapes.

The vaporizer 14 may generate aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14 or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic beater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The aerosol generating device 1 may further include general-purpose components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor (a puff detecting sensor, a temperature detecting sensor, a cigarette insertion detecting sensor, etc.). Also, the aerosol generating device 1 may be formed as a structure that, even when the cigarette 2 is inserted into the aerosol generating device 1, may introduce external air or discharge internal air.

Although not illustrated in FIGS. 1 through 3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar to a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1, or the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, opening and closing of the air passage and/or a size of the air passage formed in the aerosol generating device 1 may be adjusted by the user. Accordingly, the amount and the quality of smoking may be adjusted by the user. As another example, the external air may flow into the cigarette 2 through at least one hole formed in a surface of the cigarette 2.

Hereinafter, an example of the cigarette 2 will be described with reference to FIGS. 4 and 5.

FIGS. 4 and 5 illustrate examples of the cigarette.

Referring to FIG. 4, the cigarette 2 may include a tobacco rod 21 and a filter rod 22. FIG. 4 illustrates that the filter rod 22 includes a single segment. However, the filter rod 22 is not limited thereto. In other words, the filter rod 22 may include a plurality of segments. For example, the filter rod 22 may include a segment configured to cool an aerosol and a segment configured to filter a certain component included in the aerosol. Also, as necessary, the filter rod 22 may further include at least one segment configured to perform other functions.

The diameter of the cigarette 2 may be within the range of about 5 mm to about 9 mm and the length of the cigarette 2 may be about 48 mm. However, the disclosure is not limited thereto. For example, the length of the tobacco rod 21 may be about 12 mm, the length of the first segment of the filter rod 22 may be about 10 mm, the length of the second segment of the filter rod 22 may be about 14 mm, and the length of the third segment of the filter rod 22 may be about 12 mm. However, disclosure is not limited thereto.

The cigarette 2 may be packaged using at least one wrapper 24. The wrapper 24 may have at least one hole through which external air may be introduced or internal air may be discharged. For example, the cigarette 2 may be packaged by one wrapper 24. As another example, the cigarette 2 may be doubly packaged by two or more wrappers 24. For example, the tobacco rod 21 may be packaged by a first wrapper 241, and the filter rod 22 may be packaged by wrappers 242, 243, 243. And the entire cigarette 2 may be packaged by a single wrapper 245. When the filter rod 22 is composed of a plurality of segments, each segment may be packaged by separate wrappers 242, 243, 244.

The first wrapper 241 and the second wrapper 242 may each include general filter wrapping paper. For example, the first wrapper 241 and the second wrapper 242 may each include porous wrapping paper or non-porous wrapping paper. In addition, the first wrapper 241 and the second wrapper 242 may each include paper having oil resistance and/or an aluminum laminate packaging material.

The third wrapper 243 may include hard wrapping paper. For example, the basis weight of the third wrapper 243 may be in the range of about 88 g/m2 to about 96 g/m2, specifically, in the range of about 90 g/m2 to about 94 g/m2. In addition, the thickness of the third wrapper 243 may be in the range of about 120 μm to about 130 μm, specifically, 125 μm.

The fourth wrapper 244 may include oil-resistant hard wrapping paper. For example, the basis weight of the fourth wrapper 244 may be in the range of about 88 g/m2 to about 96 g/m2, specifically, in the range of about 90 g/m2 to about 94 g/m2. In addition, the thickness of the fourth wrapper 244 may be in the range of about 120 μm to about 130 μm, specifically 125 μm.

The fifth wrapper 245 may include sterile paper (MFW). Here, the MFW refers to paper specially prepared so that tensile strength, water resistance, smoothness, etc. thereof are further improved compared to those of general paper. For example, the basis weight of the fifth wrapper 245 may be in the range of about 57 g/m2 to about 63 g/m2, specifically, 60 g/m2. In addition, the thickness of the fifth wrapper 245 may be in the range of about 64 μm to about 70 μm, specifically, 67 μm.

A certain material may be internally added to the fifth wrapper 245. Here, an example of the certain material may include silicon, but is not limited thereto. For example, silicon has characteristics, such as heat resistance with little change with temperature, resistance to oxidation, resistance to various chemicals, water repellency against water, or electrical insulation. However, even though the certain material is not silicon, any material having the characteristics described above may be applied to (or coated on) the fifth wrapper 245 without limitation.

The fifth wrapper 245 may prevent the cigarette 2 from burning. For example, when the tobacco rod 21 is heated by the heater 13, there is a possibility that the cigarette 2 is burned. Specifically, when the temperature rises above the ignition point of any one of the materials included in the tobacco rod 21, the cigarette 2 may be burned. Even in this case, because the fifth wrapper 245 includes a non-combustible material, a burning phenomenon of the cigarette 2 may be prevented.

In addition, the fifth wrapper 245 may prevent the aerosol generating device 1 from being contaminated by substances generated in the cigarette 2. By a user's puff, liquid substances may be generated in the cigarette 2. For example, as an aerosol generated in the cigarette 2 is cooled by the outside air, liquid substances (e.g., moisture, etc.) may be generated. As the fifth wrapper 245 wraps the cigarette 2, the liquid substances generated in the cigarette 2 may be prevented from leaking out of the cigarette 2.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which is formed of tiny bits cut from a tobacco sheet. Also, the tobacco rod 21 may be surrounded by a heat conductive material. For example, the heat conductive material may be, but is not limited to, a metal foil such as aluminum foil. For example, the heat conductive material surrounding the tobacco rod 21 may uniformly distribute heat transmitted to the tobacco rod 21, and thus, the heat conductivity applied to the tobacco rod may be increased and taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

The first segment of the filter rod 22 may include a cellulose acetate filter. For example, the first segment may include a tube-shaped structure including a hollow therein. When the heater 13 is inserted by the first segment, the inner material of the tobacco rod 21 may be prevented from being pushed back, and a cooling effect of the aerosol may occur. The diameter of the hollow included in the first segment may be an appropriate diameter within the range of about 2 mm to about 4.5 mm, but is not limited thereto.

The length of the first segment may be an appropriate length within the range of about 4 mm to about 30 mm, but is not limited thereto. Specifically, the length of the first segment may be 10 mm, but is not limited thereto.

The hardness of the first segment may be adjusted by adjusting the content of a plasticizer in the manufacture of the first segment. In addition, the first segment may be manufactured by inserting a structure, such as a film or a tube including the same material or different materials, inside the first segment (e.g., into the hollow).

The second segment of the filter rod 22 cools the aerosol generated as the heater 13 heats the tobacco rod 21. Thus, a user may inhale the aerosol cooled to a suitable temperature.

The length or diameter of the second segment may be variously determined according to the shape of the cigarette 2. For example, the length of the second segment may be appropriately determined within the range of about 7 mm to about 20 mm. Specifically, the length of the second segment may be about 14 mm, but is not limited thereto.

The second segment may be fabricated by weaving polymer fibers. In this case, a flavored liquid may be applied to fibers made of polymer. Alternatively, the second segment may be fabricated by weaving a fiber to which a flavored liquid is applied and a fiber made of a polymer together. Alternatively, the second segment may be formed by a crimped polymer sheet.

For example, the polymer may include a material selected from the group consisting of polyethylene (PE), polypropylene (PP), polyvinyl chloride (PVC), polyethylene terephthalate (PET), polylactic acid (PLA), cellulose acetate (CA), and aluminum foil.

As the second segment is formed by a woven polymer fiber or crimped polymer sheet, the second segment may include a single channel or a plurality of channels extending in a longitudinal direction thereof. Here, the channel refers to a passage through which a gas (e.g., air or aerosol) passes.

For example, the second segment formed by the crimped polymer sheet may be formed from a material having a thickness between about 5 μm and about 300 μm, such as between about 10 μm and about 250 μm. Also, the total surface area of the second segment may be between about 300 mm2/mm and about 1000 mm2/mm. Furthermore, an aerosol cooling element may be formed from a material having a specific surface area between about 10 mm2/mg and about 100 mm2/mg.

The second segment may include a thread containing a volatile flavor ingredient. Here, the volatile flavor ingredient may be menthol, but is not limited thereto. For example, the thread may be filled with a sufficient amount of menthol to provide 1.5 mg or more of menthol to the second segment.

The third segment of the filter rod 22 may include a cellulose acetate filter. The length of the third segment may be appropriately determined within the range of about 4 mm to about 20 mm. For example, the length of the third segment may be about 12 mm, but is not limited thereto.

The third segment may be fabricated such that flavor is generated by spraying a flavored liquid on the third segment in the process of fabricating the third segment. Alternatively, a separate fiber to which a flavored liquid is applied may be inserted into the third segment. The aerosol generated by the tobacco rod 21 is cooled as the aerosol passes through the second segment of the filter rod 22, and the cooled aerosol is delivered to a user through the third segment. Accordingly, when a flavoring element is added to the third segment, an effect of enhancing the durability of a flavor delivered to the user may occur.

Also, the filter rod 22 may include at least one capsule 23. Here, the capsule 23 may generate a flavor or an aerosol. For example, the capsule 23 may have a configuration in which a liquid containing a flavoring material is wrapped with a film. For example, the capsule 23 may have a spherical or cylindrical shape, but is not limited thereto.

Referring to FIG. 5, the cigarette 3 according to an embodiment may further include a front-end plug 33. The front-end plug 33 may be located on one side of the tobacco rod 31 which is opposite to the filter rod 32. The front-end plug 33 may prevent the tobacco rod 31 from being detached outwards and prevent the liquefied aerosol from flowing from the tobacco rod 31 into the aerosol generating device (1 of FIGS. 1 through 3), during smoking.

The filter rod 32 may include a first segment 321 and second segment 322. Here, the first segment 321 can correspond to a first segment of a filter rod 22 of FIG. 4, and the second segment 322 can correspond to a third segment of a filter rod 22 of FIG. 4.

The diameter and total length of the cigarette 3 can correspond to the diameter and total length of the cigarette 2 of FIG. 4. For example, the length of the front-end plug 33 may be about 7 mm, the length of the tobacco rod 31 may be about 15 mm, the length of the first segment 321 may be about 12 mm, and the length of the second segment 322 may be about 14 mm, but it is not limited to this.

The cigarette 3 may be packaged via at least one wrapper 35. The wrapper 35 may have at least one hole through which external air may be introduced or internal air may be discharged. For example, the front-end plug 33 may be packaged via a first wrapper 351, and the tobacco rod 31 may be packaged via a second wrapper 352, and the first segment 321 may be packaged via a third wrapper 353, and the second segment 322 may be packaged via a fourth wrapper 354. Also, the entire cigarette 3 may be packaged via a fifth wrapper 355.

Also, the fifth wrapper 355 may have at least one hole 36. For example, the hole 36 may be formed in an area surrounding the tobacco rod 31, but is not limited thereto. The hole 36 may serve to transfer heat formed by the heater 13 shown in FIG. 2 and FIG. 3 to the inside of the tobacco rod 31.

Also, the second segment 322 may include at least one capsule 34. Here, the capsule 34 may generate a flavor or an aerosol. For example, the capsule 34 may have a configuration in which a liquid containing a flavoring material is wrapped with a film. For example, the capsule 34 may have a spherical or cylindrical shape, but is not limited thereto.

The first wrapper 351 may include general filter wrapping paper to which a metal foil, such as an aluminum foil, is coupled. For example, the total thickness of the first wrapper 351 may be in the range of about 45 μm to about 55 μm, specifically 50.3 μm. In addition, the thickness of the metal foil of the first wrapper 351 may be in the range of about 6 μm to about 7 μm, specifically 6.3 μm. In addition, the basis weight of the first wrapper 351 may be in the range of about 50 g/m2 to about 55 g/m2, specifically 53 g/m2.

The second wrapper 352 and the third wrapper 353 may each include general filter wrapping paper. For example, the second wrapper 352 and the third wrapper 353 may each include porous wrapping paper or non-porous wrapping paper.

For example, the porosity of the second wrapper 352 may be 35,000 CU, but is not limited thereto. In addition, the thickness of the second wrapper 352 may be in the range of about 70 μm to about 80 μm, specifically 78 μm. In addition, the basis weight of the second wrapper 352 may be in the range of about 20 g/m2 to about 25 g/m2, specifically, 23.5 g/m2.

For example, the porosity of the third wrapper 353 may be 24,000 CU, but is not limited thereto. In addition, the thickness of the third wrapper 353 may be in the range of about 60 μm to about 70 μm, specifically 68 μm. In addition, the basis weight of the third wrapper 353 may be in the range of about 20 g/m2 to about 25 g/m2, specifically 21 g/m2.

The fourth wrapper 354 may include PLA laminated paper. Here, the PLA laminated paper refers to a three-ply paper including a paper layer, a PLA layer, and a paper layer. For example, the thickness of the fourth wrapper 354 may be in the range of about 100 μm to about 120 μm, specifically 110 μm. In addition, the basis weight of the fourth wrapper 354 may be in the range of about 80 g/m2 to about 100 g/m2, specifically 88 g/m2.

The fifth wrapper 355 may include MFW. Here, the MFW refers to paper specially prepared so that tensile strength, water resistance, smoothness, etc. thereof are further improved compared to those of general paper. For example, the basis weight of the fifth wrapper 355 may be in the range of about 57 g/m2 to about 63 g/m2, specifically 60 g/m2. In addition, the thickness of the fifth wrapper 355 may be in the range of about 64 μm to about 70 μm, specifically 67 μm.

A certain material may be internally added to the fifth wrapper 355. Here, an example of the certain material may include silicon, but is not limited thereto. For example, silicon has characteristics, such as heat resistance with little change with temperature, resistance to oxidation, resistance to various chemicals, water repellency against water, or electrical insulation. However, even though the certain material is not silicon, any material having the characteristics described above may be applied to (or coated on) the fifth wrapper 355 without limitation.

The front-end plug 33 may include cellulose acetate. As an example, the front-end filter 33 may be fabricated by adding a plasticizer (e.g., triacetin) to a cellulose acetate tow. The mono denier of a filament constituting the cellulose acetate tow may be in the range of about 1.0 to about 10.0, specifically in the range of about 4.0 to about 6.0. More specifically, the mono denier of the filament of the front-end filter 33 may be 5.0. In addition, the cross-section of the filament constituting the front-end filter 33 may have a Y-shape. The total denier of the front-end filter 33 may be in the range of about 20,000 to about 30,000, specifically in the range of about 25,000 to about 30,000. More specifically, the total denier of the front-end filter 33 may be 28,000.

In addition, if necessary, the front-end filter 33 may include at least one channel, and the cross-section of the channel may have various shapes.

The tobacco rod 31 may correspond to the tobacco rod 21 described above with reference to FIG. 4. Therefore, a detailed description of the tobacco rod 31 is omitted below.

The first segment 321 may include cellulose acetate. For example, the first segment may include a tube-shaped structure including a hollow therein. The first segment 321 may be fabricated by adding a plasticizer (e.g., triacetin) to the cellulose acetate tow. For example, the mono denier and total denier of the first segment 321 may be the same as the mono denier and total denier of the front-end filter 33.

The second segment 322 may include cellulose acetate. The mono denier of a filament constituting the second segment 322 may be in the range of about 1.0 to about 10.0, specifically in the range of about 8.0 to about 10.0. More specifically, the mono denier of the filament of the second segment 322 may be 9.0. In addition, the cross-section of the filament of the second segment 322 may have a Y-shape. The total denier of the second segment 322 may be in the range of about 20,000 to about 30,000, specifically 25,000.

FIG. 6 is a block diagram of an aerosol generating device 600 according to another embodiment.

The aerosol generating device 600 may include a controller 610, a sensing unit 620, an output unit 630, a battery 640, a heater 650, a user input unit 660, a memory 670, and a communication unit 680. However, the internal structure of the aerosol generating device 600 is not limited to those illustrated in FIG. 6. That is, according to the design of the aerosol generating device 600, it will be understood by one of ordinary skill in the art that some of the components shown in FIG. 6 may be omitted or new components may be added.

The sensing unit 620 may sense a state of the aerosol generating device 600 and a state around the aerosol generating device 600, and transmit sensed information to the controller 610. Based on the sensed information, the controller 610 may control the aerosol generating device 600 to perform various functions, such as controlling an operation of the heater 650, limiting smoking, determining whether an aerosol generating article (e.g., a cigarette, a cartridge, or the like) is inserted, displaying a notification, or the like.

The sensing unit 620 may include at least one of a temperature sensor 622, an insertion detection sensor 624, a puff sensor 626, and a humidity sensor 628, but is not limited thereto.

The temperature sensor 622 may sense a temperature at which the heater 650 (or an aerosol generating material) is heated. The aerosol generating device 600 may include a separate temperature sensor for sensing the temperature of the heater 650, or the heater 650 may serve as a temperature sensor. Alternatively, the temperature sensor 622 may also be arranged around the battery 640 to monitor the temperature of the battery 640.

The insertion detection sensor 624 may sense insertion and/or removal of an aerosol generating article. For example, the insertion detection sensor 624 may include at least one of a film sensor, a pressure sensor, an optical sensor, a resistive sensor, a capacitive sensor, an inductive sensor, and an infrared sensor, and may sense a signal change according to the insertion and/or removal of an aerosol generating article.

The puff sensor 626 may sense a user's puff on the basis of various physical changes in an airflow passage or an airflow channel. For example, the puff sensor 626 may sense a user's puff on the basis of any one of a temperature change, a flow change, a voltage change, and a pressure change.

The humidity sensor 628 may detect the amount of moisture included in the cigarette (2 of FIG. 2). A large amount of moisture may evaporate from an excessively moist cigarette when heated, compared to a regular cigarette. Thus, condensation may occur near a portion in which the excessively moist cigarette is located. According to an embodiment, the humidity sensor 628 may be arranged at a location where condensation is highly likely to occur in the aerosol generating device 600. For example, the humidity sensor 628 may be arranged near an external hole (1002*p* of FIG. 7A) overlapping an accommodation passage (1004*h* of FIG. 7A) of the aerosol generating device 600 in a thickness direction, or in a door (1003 of FIG. 7A). The humidity sensor 628 may detect the moisture amount on the door. For example, the humidity sensor 628 may be any one of an electrically resistive sensor, a capacitive sensor, and an optical sensor. However, this is merely an example, and the humidity sensor 628 is not limited thereto.

The sensing unit 620 may include, in addition to the temperature sensor 622, the insertion detection sensor 624, and the puff sensor 626 described above, at least one of a temperature/humidity sensor, a barometric pressure sensor, a magnetic sensor, an acceleration sensor, a gyroscope sensor, a location sensor (e.g., a global positioning system (GPS)), a proximity sensor, and a red-green-blue (RGB) sensor (illuminance sensor). Because a function of each of sensors may be intuitively inferred by one of ordinary skill in the art from the name of the sensor, a detailed description thereof may be omitted.

The output unit 630 may output information on a state of the aerosol generating device 600 and provide the information to a user. The output unit 630 may include at least one of a display unit 632, a haptic unit 634, and a sound output unit 636, but is not limited thereto. When the display unit 632 and a touch pad form a layered structure to form a touch screen, the display unit 632 may also be used as an input device in addition to an output device.

The display unit 632 may visually provide information about the aerosol generating device 600 to the user. For example, information about the aerosol generating device 600 may mean various pieces of information, such as a charging/discharging state of the battery 640 of the aerosol generating device 600, a preheating state of the heater 650, an insertion/removal state of an aerosol generating article, or a state in which the use of the aerosol generating device 600 is restricted (e.g., sensing of an abnormal object), or the like, and the display unit 632 may output the information to the outside. The display unit 632 may be, for example, a liquid crystal display panel (LCD), an organic light-emitting diode (OLED) display panel, or the like. In addition, the display unit 632 may be in the form of a light-emitting diode (LED) light-emitting device.

The haptic unit 634 may tactilely provide information about the aerosol generating device 600 to the user by converting an electrical signal into a mechanical stimulus or an electrical stimulus. For example, the haptic unit 634 may include a motor, a piezoelectric element, or an electrical stimulation device.

The sound output unit 636 may audibly provide information about the aerosol generating device 600 to the user. For example, the sound output unit 636 may convert an electrical signal into a sound signal and output the same to the outside.

The battery 640 may supply power used to operate the aerosol generating device 600. The battery 640 may supply power such that the heater 650 may be heated. In addition, the battery 640 may supply power required for operations of other components (e.g., the sensing unit 620, the output unit 630, the user input unit 660, the memory 670, and the communication unit 680) in the aerosol generating device 600. The battery 640 may be a rechargeable battery or a disposable battery. For example, the battery 640 may be a lithium polymer (LiPoly) battery, but is not limited thereto.

The heater 650 may receive power from the battery 640 to heat an aerosol generating material. Although not illustrated in FIG. 6, the aerosol generating device 600 may further include a power conversion circuit (e.g., a direct current (DC)/DC converter) that converts power of the battery 640 and supplies the same to the heater 650. In addition, when the aerosol generating device 600 generates aerosols in an induction heating method, the aerosol generating device 600 may further include a DC/alternating current (AC) that converts DC power of the battery 640 into AC power.

The controller 610, the sensing unit 620, the output unit 630, the user input unit 660, the memory 670, and the communication unit 680 may each receive power from the battery 640 to perform a function. Although not illustrated in FIG. 6, the aerosol generating device 600 may further include a power conversion circuit that converts power of the battery 640 to supply the power to respective components, for example, a low dropout (LDO) circuit, or a voltage regulator circuit.

In an embodiment, the heater 650 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, nichrome, or the like, but is not limited thereto. In addition, the heater 650 may be implemented by a metal wire, a metal plate on which an electrically conductive track is arranged, a ceramic heating element, or the like, but is not limited thereto.

In another embodiment, the heater 650 may be a heater of an induction heating type. For example, the heater 650 may include a susceptor that heats an aerosol generating material by generating heat through a magnetic field applied by a coil.

In an embodiment, the heater 650 may include a plurality of heaters. For example, the heater 650 may include a first heater for heating the cigarette and a second heater for heating the liquid composition.

The user input unit 660 may receive information input from the user or may output information to the user. For example, the user input unit 660 may include a key pad, a dome switch, a touch pad (a contact capacitive method, a pressure resistance film method, an infrared sensing method, a surface ultrasonic conduction method, an integral tension measurement method, a piezo effect method, or the like), a jog wheel, a jog switch, or the like, but is not limited thereto. In addition, although not illustrated in FIG. 6, the aerosol generating device 600 may further include a connection interface, such as a universal serial bus (USB) interface, and may connect to other external devices through the connection interface, such as the USB interface, to transmit and receive information, or to charge the battery 640.

The memory 670 is a hardware component that stores various types of data (i.e. temperature profile) processed in the aerosol generating device 600, and may store data processed and data to be processed by the controller 610. The memory 670 may include at least one type of storage medium from among a flash memory type, a hard disk type, a multimedia card micro type memory, a card-type memory (for example, secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, and an optical disk. The memory 670 may store an operation time of the aerosol generating device 600, the maximum number of puffs, the current number of puffs, at least one temperature profile, data on a user's smoking pattern, etc.

The communication unit 680 may include at least one component for communication with another electronic device. For example, the communication unit 680 may include a short-range wireless communication unit 682 and a wireless communication unit 684.

The short-range wireless communication unit 682 may include a Bluetooth communication unit, a Bluetooth Low Energy (BLE) communication unit, a near field communication unit, a wireless LAN (WLAN) (Wi-Fi) communication unit, a Zigbee communication unit, an infrared data association (IrDA) communication unit, a Wi-Fi Direct (WFD) communication unit, an ultra-wideband (UWB) communication unit, an Ant+ communication unit, or the like, but is not limited thereto.

The wireless communication unit 684 may include a cellular network communication unit, an Internet communication unit, a computer network (e.g., local area network (LAN) or wide area network (WAN)) communication unit, or the like, but is not limited thereto. The wireless communication unit 684 may also identify and authenticate the aerosol generating device 600 within a communication network by using subscriber information (e.g., International Mobile Subscriber Identifier (IMSI)).

The controller 610 may control general operations of the aerosol generating device 600. In an embodiment, the controller 610 may include at least one processor. The processor may be implemented as an array of a plurality of logic gates or may be implemented as a combination of a general-purpose microprocessor and a memory in which a program executable by the microprocessor is stored. It will be understood by one of ordinary skill in the art that the processor may be implemented in other forms of hardware.

The controller 610 may control the temperature of the heater 650 by controlling supply of power of the battery 640 to the heater 650. For example, the controller 610 may control power supply by controlling switching of a switching element between the battery 640 and the heater 650. In another example, a direct heating circuit may also control power supply to the heater 650 according to a control command of the controller 610.

The controller 610 may analyze a result sensed by the sensing unit 620 and control subsequent processes to be performed. For example, the controller 610 may control power supplied to the heater 650 to start or end an operation of the heater 650 on the basis of a result sensed by the sensing unit 620. As another example, the controller 610 may control, based on a result sensed by the sensing unit 620, an amount of power supplied to the heater 650 and the time the power is supplied, such that the heater 650 may be heated to a certain temperature or maintained at an appropriate temperature.

The controller 610 may control the output unit 630 on the basis of a result sensed by the sensing unit 620. For example, when the number of puffs counted through the puff sensor 626 reaches a preset number, the controller 610 may notify the user that the aerosol generating device 600 will soon be terminated through at least one of the display unit 632, the haptic unit 634, and the sound output unit 636.

The controller 610 may determine the humidity state of the cigarette by using the humidity sensor 628. The controller 610 may operate the heater 650 with a temperature profile corresponding to the determined humidity state of the cigarette. Hereinafter, with reference to FIGS. 7A to 10, a detailed method of determining a humidity state of a cigarette by using the humidity sensor 628 is described in detail.

FIG. 7A is a perspective view of an exterior of an aerosol generating device, according to an embodiment. FIG. 7B is a perspective view showing an operation state in which some components are separated from the aerosol generating device according to the embodiment of FIG. 7A.

Referring to FIG. 7A, an aerosol generating device 1000 may include a case 1100 and a cover 1002. As the cover 1002 is coupled to an end portion of the case 1100, the case 1100 and the cover 1002 form the exterior of the aerosol generating device 1000.

The case 1100 may form a portion of the exterior of the aerosol generating device 1000 and accommodate therein various components to protect the same.

The cover 1002 and the case 1100 may each include a plastic material, through which heat is not transferred well, or a metal material coated with a heat-shielding material. The cover 1002 and the case 1100 may be manufactured according to, for example, an injection molding method, a three-dimensional (3D) printing method, or a method whereby small components manufactured according to injection molding are assembled.

A maintaining device (not shown) may be installed between the cover 1002 and the case 1100, the maintaining device for maintaining a state in which the cover 1002 is coupled to the case 1100. The maintaining device may include, for example, protrusions and grooves. As the protrusions remain coupled to the grooves, the coupling of the cover 1002 to the case 1100 may be maintained, and a structure, in which the protrusions are separated from the grooves as the protrusions are moved by an operation button pressed by a user, may be used.

Also, the maintaining device may include, for example, a magnet and a metal material attached to the magnet. When the maintaining device includes a magnet, the magnet may be installed on any one of the case 1100 and the cover 1002, and a metal material attached to the magnet may be installed on the other thereof. Alternatively, magnets may be installed on both the case 1100 and the cover 1002.

In an upper surface of the cover 1002 coupled to the case 1100, the external hole 1002*p* into which a cigarette 2000 may be inserted may be formed. In addition, a rail 1003*r* is formed adjacent to the external hole 1002*p* in the upper surface of the cover 1002. The door 1003 that may slide along the upper surface of the cover 1002 may be installed in the rail 1003*r*. The door 1003 may slide along the rail 1003*r* in a straight line.

The door 1003 moves along the rail 1003*r* in a direction indicated by an arrow of FIG. 7A such that the external hole 1002*p* and an insertion hole 1004*p* are externally exposed, wherein the external hole 1002*p* allows the cigarette 2000 to pass through the cover 1002 and the insertion hole 1004*p* allows the cigarette 2000 to be inserted into the case 1100. The external hole 1002*p* of the cover 1002 may externally expose the insertion hole 1004*p* in the accommodation passage 1004*h*, in which the cigarette 2000 is accommodated.

When the external hole 1002*p* is exposed to the outside by the door 1003, the user may insert an end portion 2000*b* of the cigarette 2000 into the external hole 1002*p* and the insertion hole 1004*p* and mount the cigarette 2000 into the accommodation passage 1004*h* formed inside the cover 1002.

The rail 1003*r* has a concave groove, but one or more embodiments are not limited thereto. For example, the rail 1003*r* may have a convex shape and extend not in a straight line but in a curved line.

A button 1009 is installed on the case 1100. As the button 1009 is controlled, the operation of the aerosol generating device 1000 may be controlled.

While the cover 1002 is coupled to the case 1100, an external air inflow gap 1002*g* is formed in a portion in which the cover 1002 is coupled to the case 1100, wherein air may flow into the cover 1002 through the external air inflow gap 1002*g*.

Referring to FIG. 7B, while the cigarette 2000 is inserted into the aerosol generating device 1000, the user may hold the cigarette 2000 in their mouth to inhale an aerosol.

The case 1100 may include an upper case 1100*a*, in which the cigarette 2000 is inserted and heated, and a lower case 1100*b* which supports and protects various components in the case 1100. Hereinafter, the case 1100 refers to both the upper case 1100*a* and the lower case 1100*b*.

The cover 1002 may be coupled to the case 1100 to cover a cigarette support 4 coupled to the case 1100. Also, according to necessity, the cover 1002 may be separated from the case 1100.

FIGS. 8A and 8B each are a top view of the cover of FIGS. 7A and 7B.

Referring to FIGS. 7A, 8A, and 8B, humidity sensors HS1 and HS2 may detect the amount of moisture included in the cigarette 2000. The humidity sensors HS1 and HS2 may measure the amount of moisture, based on moisture (WT of FIG. 9A) condensed on the upper surface of the cover 1002 as the cigarette 2000 is heated.

When the cigarette 2000 contains moisture, the moisture may evaporate while the cigarette 2000 is heated and may be condensed on the upper surface of the cover 1002. When the cigarette 2000 has a high moisture content, a greater amount of moisture evaporates from the cigarette 2000 than from a dry general cigarette, and thus, the condensation may be more severe on the upper surface of the cover 1002. That is, the amount of moisture condensed on the upper surface of the cover 1002 may be in proportion to the amount of moisture included in the cigarette 2000.

According to an embodiment, the humidity sensors HS1 and HS2 may be arranged at locations where condensation is highly likely to occur in the aerosol generating device 1000.

As shown in FIG. 8A, for example, the cover 1002 may include the external hole 1002*p* overlapping the accommodation passage 1004*h* in the thickness direction. The humidity sensor HS1 may be arranged along an outline of the external hole 1002*p*. In this case, the outline of the external hole 1002*p* has a circular shape, and the humidity sensor HS1 may have a ring shape.

The shape of the outline of the external hole 1002*p* is merely an example and not limited thereto. For example, the shape of the outline of the external hole 1002*p* may be any one of an oval, a triangle, a rectangle, and a polygon.

The shape and the arrangement of the humidity sensor HS1 is merely an example and not limited thereto. For example, the shape of the humidity sensor HS1 may be an oval, a triangle, a rectangle, a polygon, or the like including a cavity at the center thereof to correspond to the shape of the outline of the external hole 1002*p*. Also, the humidity sensor HS1 may be arranged on at least a portion of the upper surface of the cover 1002. That is, the humidity sensor HS1 may be arranged on the entire upper surface of the cover 1002 or arbitrarily arranged on an upper portion of the cover 1002.

As another example, as shown in FIG. 8B, the cover 1002 may include the door 1003 that may slide along the upper surface of the cover 1002. The humidity sensor HS2 may be arranged on an upper surface of the door 1003. In this case, the upper surface of the door 1003 may have a circular shape, and the humidity sensor HS2 may be formed on the entire upper surface of the door 1003.

However, the shape of the upper surface of the door 1003 is merely an example and not limited thereto. For example, the shape of the upper surface of the door 1003 may be any one of an oval, a triangle, a rectangle, and a polygon.

The shape and the arrangement of the humidity sensor HS2 is merely an example and not limited thereto. For example, the shape of the humidity sensor HS2 may be an oval, a triangle, a rectangle, a polygon, or the like to correspond to the shape of the upper surface of the door 1003. Also, the humidity sensor HS2 may be arranged on at least a portion of the upper surface of the door 1003. That is, the humidity sensor HS2 may be arbitrarily arranged on an upper portion of the door 1003, not on the entire upper surface thereof.

As described, when the humidity sensors HS1 and HS2 are arranged on the cover 1002, better spatial utilization may be expected, as opposed to when humidity sensors need to be arranged in the accommodation passage 1004*h*. When humidity sensors are arranged in the accommodation passage 1004*h*, there is an arrangement limitation that the humidity sensors have to avoid the heater (650 of FIG. 6). Thus, the humidity sensors may be arranged adjacent to the filter rod (22 of FIG. 4) instead of the tobacco rod (21 of FIG. 4) that mainly contains moisture. On the contrary, the humidity sensors HS1 and HS2 according to an embodiment measure the amount of moisture which is condensed on the cover 1002 because of the evaporation of the moisture included in the cigarette 2000 when the cigarette 2000 is heated, and thus, the humidity sensors HS1 and HS2 may be relatively freely arranged on at least a portion of the cover 1002.

FIG. 9A is a cross-sectional view of a capacitive humidity sensor. FIG. 9B is a cross-sectional view of an electrically resistive humidity sensor. FIG. 9C is a cross-sectional view of an optical humidity sensor. In this case, operation principles of the humidity sensor HS1 of FIG. 8A and the humidity sensor HS2 of FIG. 8B are substantially the same as each other, and hereinafter, the humidity sensor is described based on the humidity sensor HS1 of FIG. 8A for convenience of explanation.

Referring to FIGS. 8A and 9A to 9C, the humidity sensor HS1 may be any one of an electrically resistive sensor, a capacitive sensor, and an optical sensor.

Referring to FIGS. 6, 8A, and 9A, a surface of the humidity sensor HS1 may form a continuous surface with the upper surface of the cover 1002. The humidity sensor HS1 may include a plurality of electrodes E1, a substrate SUB1, and a coating layer CT.

The electrodes E1 may each include a conductive material. For example, the electrode E1 may include a highly conductive metal material, such as gold (Au), silver (Ag), copper (Cu), or aluminum (Al).

A capacitance between the electrodes E1 may differ according to the amount of moisture WT between the electrodes E1. For example, as the amount of moisture WT condensed on the coating layer CT increases, the capacitance may also increase.

The electrodes E1 may be mounted on the substrate SUB1. The coating layer CT may include a polymer composite surrounding the electrodes E1 and the substrate SUB1.

The humidity sensors HS1 and HS2 may output electrical signals corresponding to the capacitance between the electrodes E1 to an external component (e.g., a controller 610). The humidity sensor HS1 may detect a change in the capacitance between the electrodes E1 and output an electrical signal corresponding to a result of the detecting to the external component (e.g., the controller 610).

The controller 610 may detect the amount of moisture condensed on the coating layer CT, in response to a signal transmitted from the humidity sensor HS1.

Referring to FIGS. 6, 8A, and 9B, a surface of the humidity sensor HS1 may form a continuous surface with the upper surface of the cover 1002. The humidity sensor HS1 may include a plurality of electrodes E2, a substrate SUB2, and a dehumidifying agent DH.

The electrodes E2 may each include a conductive material. For example, the electrode E2 may include a highly conductive metal material, such as Au, Ag, Cu, or Al. Although not explicitly shown in FIG. 9B, the electrodes E2 may have a configuration in which a pair of comb-shaped electrodes E2 are alternately arranged in a plane. Each of the comb-shaped electrodes E2 may include a first portion extending in a first direction, and a plurality of second portions branched in a second direction that is orthogonal to the first direction.

The dehumidifying agent DH may include a material absorbing ambient moisture WT. For example, the dehumidifying agent DH may include a conductive polymer, such as lithium chloride (LiCl) or aluminum oxide (Al2O3).

A resistance between the electrodes E2 may differ according to the amount of moisture WT absorbed by the dehumidifying agent DH. For example, as the amount of moisture WT absorbed by the dehumidifying agent DH increases, the resistance may decrease.

The electrodes E2 may be mounted on the substrate SUB2.

The humidity sensor HS1 may output an electrical signal corresponding to the resistance between the electrodes E2 to the external component (e.g., the controller 610). The humidity sensor HS1 may detect a change in the resistance between the electrodes E2 and output an electrical signal corresponding to a result of the detecting to the external component (e.g., the controller 610).

The controller 610 may detect the amount of moisture absorbed by the dehumidifying agent DH (or condensed), in response to a signal transmitted from the humidity sensor HS1.

Referring to FIGS. 6, 8A, and 9C, the surface of the humidity sensor HS1 may form a continuous surface with the upper surface of the cover 1002. The humidity sensor HS1 may include an emission portion EM, a light-receiving portion RC, a substrate SUB3, and the coating layer CT.

The emission portion EM may include at least one light source that generates light. For example, the emission portion EM may include a light-emitting diode (LED), an organic light-emitting diode (OLED), a laser diode (LD), and the like as light sources. In this case, the light sources included in the emission portion EM may be arranged in a certain pattern.

The emission portion EM may irradiate light in a certain direction that is set in advance. For example, the emission portion EM may include a first light-collecting portion (not shown) configured to collect light generated from a light source towards an object. Here, the first light-collecting portion may include an imaging lens, a Diffractive Optical Element (DOE), and the like.

The light-receiving portion RC may include a photodiode reacting to light. The light-receiving portion RC may output an electrical signal corresponding to light that is incident to the photodiode.

The light-receiving portion RC may include a second light-collecting portion (not shown) that collects light reflected from the object (hereinafter, referred to as reflected light). For example, the reflected light that is collected by the second light-collecting portion may be transmitted to the photodiode included in the light-receiving portion RC. In this case, the second light-collecting portion may include a lens receiving the reflected light that is incident in a certain direction.

The light-receiving portion RC may further include an optical filter (not shown) that limitedly penetrates light in a certain wavelength region. For example, the optical filter may be an infrared pass filter limitedly penetrating infrared rays in a wavelength range from about 780 nm to about 1 mm.

The emission portion EM and the light-receiving portion RC may be mounted on the substrate SUB3. The coating layer CT may include a polymer composite surrounding the emission portion EM, the light-receiving portion RC, and the substrate SUB3.

The light irradiated from the emission portion EM in a preset direction may be reflected from the moisture WT condensed on the coating layer CT, and transmitted to the light-receiving portion RC. In this case, the light-receiving portion RC may output an electrical signal corresponding to the amount of light that is incident to the photodiode.

According to the amount of moisture WT condensed on the coating layer CT, a temporal difference between a point in time, when the light is irradiated from the emission portion EM, and a point in time, when the reflected light is incident to the light-receiving portion RC, may vary.

For example, when the amount of moisture WT condensed on the coating layer CT is large, the light may be easily reflected from the moisture WT, compared to when the amount of moisture WT is small. In this case, the temporal difference between the point in time, when the light is irradiated from the emission portion EM, and the point in time, when the reflected light is incident to the light-receiving portion RC, may decrease.

The humidity sensor HS1 may output, to the external component (e.g., the controller 610), an electrical signal corresponding to the amount of light, which is incident to the light-receiving portion RC, and/or an electrical signal corresponding to the temporal difference. The humidity sensor HS1 may detect a change in the amount of light, which is incident to the light-receiving portion RC, and/or a change in the temporal difference and output, to the external component (e.g., the controller 610), an electrical signal corresponding to a result of the detecting.

The controller 610 may detect the amount of moisture condensed on the coating layer CT, based on a signal transmitted from the humidity sensor HS1.

Referring to FIGS. 7A to 9C, the controller 610 may classify the cigarette 2000 into a general cigarette or an excessively moist cigarette, based on the amount of moisture which is detected by the humidity sensors HS1 and HS2.

According to an embodiment, the controller 610 may compare the amount of moisture, which is detected by the humidity sensors HS1 and HS2, with the preset threshold value to determine the humidity of the cigarette 2000. In this case, the preset threshold value may be the minimum moisture amount that the user may feel heat because of the moisture included inside the cigarette 2000 when the user inhales an aerosol. For example, when the moisture amount of less than a threshold value, the controller 610 may determine that the cigarette 2000 is a general cigarette, and when the moisture amount is greater than or equal to the threshold value, the controller 610 may determine that the cigarette 2000 is an excessively moist cigarette.

When the cigarette 2000 is determined as a general cigarette, the controller 610 may drive the heater 650 according to a first temperature profile TP1, and when the cigarette 2000 is determined as an excessively moist cigarette, the controller 610 may drive the heater 650 according to a second temperature profile TP2. Hereinafter, the first temperature profile TP1 and the second temperature profile TP2 are described in detail with reference to FIG. 10.

FIG. 10 is a graph for explaining temperature profiles. In this case, a graph indicated by a solid line indicates a first temperature profile for a general cigarette, and a graph indicated by a dash-dotted line indicates a second temperature profile for an excessively moist cigarette.

Referring to FIG. 10, the first temperature profile TP1 indicates temperature values by time optimized for a general cigarette. The first temperature profile TP1 may be classified into a first period P1 that is a preheating period, and a second period P2 that is a smoking period.

The first period P1 may include a period in which a temperature increases from a first temperature T1, which is an outdoor temperature, to a second temperature T2, at which an aerosol generating material is volatilized, and a period in which the temperature falls to a third temperature T3 at which smoking starts. The second period P2 may include a period in which the temperature decreases from the third temperature T3 to a fourth temperature T4, which is a maintenance temperature, and a period in which the fourth temperature T4 is maintained. In this case, the second temperature T2, the third temperature T3, and the fourth temperature T4 may be greater than or equal to a temperature at which the aerosol generating material is volatilized and may differ according to a type of the aerosol generating material.

The second temperature profile TP2 indicates temperature values by time which are optimized for an excessively moist cigarette. The second temperature profile TP2 may be classified into a third period P3 that is a preheating period, and a fourth period P4 that is a smoking period.

The third period P3 may include a period in which a temperature rises from a first temperature T1, which is an outdoor temperature, to a second temperature T2, at which an aerosol generating material is volatilized, a period in which the second temperature T2 is maintained, and a period in which the temperature falls to a fourth temperature T4 at which smoking starts. The fourth period P4 may include a period in which the fourth temperature T4 is maintained.

In this case, a time taken to reach the second temperature T2 according to the second temperature profile TP2 may be greater than a time taken to reach the second temperature T2 according to the first temperature profile TP1 due to the moisture in the cigarette 2000.

Also, while the temperature is constantly maintained at the second temperature T2 after the second temperature profile TP2 reaches the second temperature T2, at least part of the moisture inside the cigarette 2000 may evaporate. Thus, an initial heat sensation may be alleviated. On the contrary, when the amount of moisture in the cigarette 2000 is less than the threshold value, the user may be less likely to feel heat because of the moisture in the cigarette 2000, and thus, the first temperature profile TP1 may not include a period in which the moisture in the cigarette 2000 evaporates. That is, the preheating period P3 of the second temperature profile TP2 may be greater than the preheating period P1 of the first temperature profile TP1, and a third temperature T3, which is a smoking start temperature of the general cigarette, may be higher than a fourth temperature T4, which is a smoking start temperature of the excessively moist cigarette.

FIG. 11 is a flowchart for explaining an operating method of an aerosol generating device, according to an embodiment.

Referring to FIGS. 6 to 11, an operating method of an aerosol generating device may include operation S100 of heating the cigarette 2000 by using the heater 650, operation S200 of measuring the amount of moisture condensed on the cover 1002 by using the humidity sensors HS1 and HS2, operation S300 of comparing the measured amount of moisture with a preset threshold value, operation S410 and S420 of determining humidity of the cigarette 2000, and operation S500 of driving the heater 650 according to a temperature profile corresponding to the determined humidity of the cigarette 2000.

In this case, the aerosol generating device 1000 may include the case 1100, which includes the accommodation passage 1004*h* into which the cigarette 2000 is inserted, and the cover 1002, which is coupled to the case 1100 and includes the external hole 1002*p* overlapping the accommodation passage 1004*h* in the thickness direction.

In detail, in operation S100 of heating the cigarette 2000, when the cigarette 2000 contains the moisture, the moisture may evaporate when the cigarette 2000 is heated and thus may be condensed on the upper surface of the cover 1002. When the cigarette contains much moisture, a greater amount of moisture may evaporate from the cigarette than from a dry general cigarette, and thus, the condensation may be more severe on the upper surface of the cover 1002. That is, the amount of moisture condensed on the upper surface of the cover 1002 may be proportional to the amount of moisture included in the cigarette 2000.

In operation S200 of measuring the amount of moisture condensed on the cover 1002 by using the humidity sensors HS1 and HS2, the humidity sensors HS1 and HS2 may be arranged at locations where the condensation may be highly likely to occur in the aerosol generating device (1000 of FIG. 7A).

For example, as shown in FIG. 8A, the cover 1002 may include the external hole 1002*p* overlapping the accommodation passage (1004*h* of FIG. 7A) in the thickness direction. The humidity sensor HS1 may be arranged along the outline of the external hole 1002*p*. In this case, the outline of the external hole 1002*p* may have a circular shape, and the humidity sensor HS1 may have a ring shape.

As another example, as shown in FIG. 8B, the cover 1002 may include the door 1003 that may slide along the upper surface of the cover 1002. The humidity sensor HS1 may be arranged on the upper surface of the door 1003. In this case, the upper surface of the door 1003 may have a circular shape, and the humidity sensor HS2 may be formed on the entire upper surface of the door 1003.

In this case, the humidity sensor HS1 may be any one of an electrically resistive sensor, a capacitive sensor, and an optical sensor.

In operation S300 of comparing the measured amount of humidity with a preset threshold value and operation S400 of determining humidity of the cigarette 2000, the controller 610 may classify the cigarette 2000 into a general cigarette and an excessively moist cigarette, based on the amount of moisture which is detected by the humidity sensors HS1 and HS2. The controller 610 may compare, with the preset threshold value, the amount of moisture which is detected by the humidity sensors HS1 and HS2 and determine the humidity of the cigarette 2000. In this case, the preset threshold value may be the minimum moisture amount that the user may feel heat because of the moisture included inside the cigarette 2000 when the user inhales an aerosol. For example, when the amount of moisture is greater than or equal to the threshold value, the controller 610 may determine that the cigarette 2000 is an excessively moist cigarette in operation S410, and when the amount of moisture is less than the threshold value, the controller 610 may determine that the cigarette 2000 is a general cigarette in operation S420.

In operation S500 of driving the heater 650 according to a temperature profile corresponding to the determined humidity of the cigarette 2000, the controller 610 may drive the heater 650 according to the first temperature profile TP1 when the cigarette 2000 is determined as the general cigarette and may drive the heater 650 according to the second temperature profile TP2 when the cigarette 2000 is determined as the excessively moist cigarette. The first temperature profile TP1 may be classified into the first period P1, which is the preheating period, and the second period P2, which is the smoking period. The second temperature profile TP2 may be classified into the third period P3, which is the preheating period, and the fourth period P4, which is the smoking period. In this case, the preheating period P3 of the second temperature profile TP2 may be greater than the preheating period P1 of the first temperature profile TP1. Therefore, at least a portion of the moisture included in the cigarette 2000 may evaporate, and the initial heat sensation may be alleviated.

Those of ordinary skill in the art related to the present embodiments may understand that various changes in form and details can be made therein without departing from the scope of the characteristics described above. Therefore, the disclosed methods should be considered in a descriptive point of view, not a restrictive point of view. The scope of the present disclosure is defined by the appended claims rather than by the foregoing description, and all differences within the scope of equivalents thereof should be construed as being included in the present disclosure.

The invention claimed is:

1. An aerosol generating device comprising:

a case comprising an accommodation passage configured to receive a cigarette;

a cover coupled to the case;

a heater configured to heat the cigarette;

a humidity sensor arranged on an upper surface of the cover; and a controller configured to determine a humidity of the cigarette by comparing a moisture amount, which is detected by the humidity sensor, with a preset threshold value.

2. The aerosol generating device of claim 1, wherein the humidity sensor is configured to measure the moisture amount, based on moisture that is condensed on the cover as the cigarette is heated.

3. The aerosol generating device of claim 1, wherein the cover comprises an external hole formed in a thickness direction and overlapping the accommodation passage, and the humidity sensor is arranged along an outline of the external hole.

4. The aerosol generating device of claim 3, wherein the outline of the external hole has a circular shape, and the humidity sensor has a ring shape.

5. The aerosol generating device of claim 1, wherein the cover comprises a door that is slidable along an upper surface of the cover, and the humidity sensor is arranged on an upper surface of the door.

6. The aerosol generating device of claim 5, wherein the upper surface of the door has a circular shape, and the humidity sensor is formed on the entire upper surface of the door.

7. The aerosol generating device of claim 1, wherein the humidity sensor comprises any one of an electrically resistive sensor, a capacitive sensor, and an optical sensor.

8. The aerosol generating device of claim 1, wherein the heater is arranged in the accommodation passage and heats the cigarette by an induction heating method.

9. The aerosol generating device of claim 1, wherein the controller is further configured to determine the cigarette as a general cigarette when the moisture amount is less than the threshold value, and to determine the cigarette as an excessively moist cigarette when the moisture amount is greater than or equal to the threshold value.

10. The aerosol generating device of claim 9, wherein the controller is further configured to drive the heater according to a first temperature profile when the cigarette is determined as a general cigarette, and to drive the heater according to a second temperature profile when the cigarette is determined as the excessively moist cigarette.

11. The aerosol generating device of claim 10, wherein a preheating period of the second temperature profile is greater than a preheating period of the first temperature profile.

12. An operating method of an aerosol generating device, the operating method comprising:

heating a cigarette by a heater;

determining humidity of the cigarette by comparing a moisture amount, which is detected by a humidity sensor, with a preset threshold value; and driving the heater according to a temperature profile corresponding to the determined humidity of the cigarette, wherein the aerosol generating device comprises a case, which comprises an accommodation passage into which the cigarette is inserted, and an external hole formed in the case in a thickness direction and overlapping the accommodation passage, and the humidity sensor is arranged on an upper surface of the cover.

13. The operating method of claim 12, wherein, in the determining of the humidity of the cigarette, the moisture amount is measured based on moisture that is condensed on the cover as the cigarette is heated.

14. The operating method of claim 12, wherein the cover comprises a door that is slidable along an upper surface of the cover, and the humidity sensor is arranged on an upper surface of the door.

15. The operating method of claim 12, wherein the humidity sensor comprises any one of an electrically resistive sensor, a capacitive sensor, and an optical sensor.

* * * * *